(12) United States Patent
Davidson

(10) Patent No.: US 10,046,937 B2
(45) Date of Patent: Aug. 14, 2018

(54) PAINTERS MASKING TAPE TOOL

(71) Applicant: John L. Davidson, Kingsville (CA)

(72) Inventor: John L. Davidson, Kingsville (CA)

( * ) Notice: Subject to any disclaimer, the term of this patent is extended or adjusted under 35 U.S.C. 154(b) by 0 days.

(21) Appl. No.: 15/221,795

(22) Filed: Jul. 28, 2016

(65) Prior Publication Data

US 2018/0029820 A1     Feb. 1, 2018

(51) Int. Cl.
| B65H 35/07 | (2006.01) |
| B65H 37/00 | (2006.01) |
| B65H 35/00 | (2006.01) |
| B32B 37/00 | (2006.01) |
| B05B 12/24 | (2018.01) |

(52) U.S. Cl.
CPC ......... B65H 35/0033 (2013.01); B05B 12/24 (2018.02); B32B 37/0053 (2013.01); *Y10T 156/1795* (2015.01)

(58) Field of Classification Search
CPC .............. B65H 35/003; B65H 35/0033; B65H 35/0013; B05B 12/24; Y10T 156/1795
USPC ......................................................... 156/577
See application file for complete search history.

(56) References Cited

U.S. PATENT DOCUMENTS

| 2,846,106 | A | * | 8/1958 | Castiglione | ........ | B65H 35/0033 |
| | | | | | | 156/523 |
| RE25,056 | E | * | 10/1961 | Fritzinger | .......... | B65H 35/0033 |
| | | | | | | 12/142 R |
| 3,537,942 | A | | 11/1970 | Kefalos | | |
| 3,547,740 | A | | 12/1970 | Hinds | | |
| 3,740,297 | A | * | 6/1973 | Vidinsky | ............ | B65H 35/0033 |
| | | | | | | 156/523 |
| 3,871,940 | A | * | 3/1975 | Antonioni | ........... | B05B 15/0456 |
| | | | | | | 156/353 |
| 3,895,059 | A | * | 7/1975 | Link | .................. | B65H 35/0033 |
| | | | | | | 156/527 |
| 4,891,090 | A | * | 1/1990 | Lorincz | ................. | B65H 37/007 |
| | | | | | | 156/577 |
| 6,302,177 | B1 | * | 10/2001 | Gruber | ............... | B65H 35/0033 |
| | | | | | | 156/527 |
| 6,478,068 | B1 | | 11/2002 | Brown | | |
| 6,684,926 | B2 | | 2/2004 | Matechuk | | |
| 6,926,059 | B2 | * | 8/2005 | Somers | .............. | B65H 35/0033 |
| | | | | | | 156/577 |
| 7,198,086 | B2 | * | 4/2007 | Dusich | ............... | B65H 35/0033 |
| | | | | | | 156/525 |
| 7,441,581 | B2 | * | 10/2008 | Pitzen | ................ | B65H 35/0033 |
| | | | | | | 156/574 |
| 7,763,136 | B2 | * | 7/2010 | Richards | ............ | B65H 35/0033 |
| | | | | | | 156/574 |
| 9,586,782 | B2 | * | 3/2017 | Chalifoux | ............ | B65H 35/002 |

(Continued)

*Primary Examiner* — Mark A Osele

(57) ABSTRACT

Provided is a tape applicator tool for the placement of adhesive backed tape onto a surface. The tool comprises a frame unit having a handle; a rotatable spool which frictionally engages a roll of tape, a static front shoe which engages the tape by drawing the tape around the front shoe, thereby applying the tape to the surface, the front shoe having a slot, and a static rear shoe which forces to the tape towards the surface. The rotatable spool, the front shoe and the rear shoe are spaced apart in triangulation and are on parallel axes. The tool further comprise a removable measuring stop extending from the frame, adjacent the front shoe and away from the front shoe. Optionally, the tool comprises a removable cutter unit.

20 Claims, 2 Drawing Sheets

(56) References Cited

U.S. PATENT DOCUMENTS

2003/0094243 A1\* 5/2003 Charriere ........... B65H 35/0033
          156/577
2009/0272497 A1\* 11/2009 Pyles ................. B65H 35/0033
          156/523

\* cited by examiner

PAINTERS MASKING TAPE TOOL

BACKGROUND OF INVENTION

Masking tape is an essential product of the painting and decorating industry and much of it is placed by the professional painter using a practiced, well honed level of skill and dexterity. The DIY (Do-it-yourself) person often does not have the opportunity to practice this task and consequently do not acquire the level of skill required to complete a quality job. Typically and tediously the masking tape is placed manually along the top edge of baseboard to shield the baseboard from being splashed with wet paint as the wall is being painted, Typically it is also placed around window and door trim and along carpet and baseboard intersections or other floor covering. It is also used to protect the intersections of wall and ceiling surfaces. Again, it is often the product used to mask off glass around a painted or stained window frame, but is not limited to any of the above applications.

The masking tape tool will place the masking tape accurately to the required surface at the intersection.

Prior state of technology U.S. Pat. No. 3,547,740 Dec. 15 1970 Inventor Hinds Schubert W.

The design has left very little room between the scissor type cutter and the tape to safely grip the tape to reload around the front roller.

U.S. Pat. No. 3,537,942 Nov. 3 1970 George Kefalos.

No on-board cutter or measuring device is a significant shortcoming to this tool.

U.S. Pat. No. 6,478,068 Nov. 12 2002 J. Paul Brown.

Highly engineered with a multiplicity of parts contributing to expensive manufacturing costs and resulting in impractical retail cost. Relies on a roller to apply tape and a guide pin for guiding the adhesive tape.

U.S. Pat. No. 6,684,926 also CA2389466A1 Dec. 6 2002 Inventor Edward Matechuk.

Limited by no measuring stop device. Cutter is ineffective as it wants to push tape aside rather than piercing the tape.

There are many masking tape tools with individual shortcomings such as high engineering costs, a lack of on-board cutters and no means of measuring tape up to an abutting surface and all are lacking the means to use a variety of generic standard width tape.

It can be appreciated that a need exists for a low cost adaptable tool with an on-board cutter and measuring stop to cleanly cut tape without unnecessary stretching or tearing of the tape and a means of accurately measuring the tape prior to cutting that is needed to mask a surface up to an abutting plane.

Individual painters preferences, often requires the use of tape of a differing width. This tool quickly adapts from the standard 1" tape width (using snap-on sleeves of appropriate width) to a functional tool using standard 1.25" tape width and again to a standard tape width of 1.5" and again to a standard tape width of 2" for a total of four standard widths of tape, all of which are readily available stock items in the hardware and painting stores.

Masking tape is sensitive to uneven stretching as it is being placed. Often the unskilled painter, when applying the tape stretches the tape randomly, thus rendering it useless as it will then be practically impossible to apply it in a straight line at the intended intersection.

This Tape tool has an on-board cutter and measuring stop to readily permit the proper tape length to be cut accurately, precisely and cleanly without stretching or pulling of the tape or otherwise unequally tensioning the tape as to cause it either to be pulled off the applied surface or to cause it to be pulled out of alignment both of which would defeat the intended purpose of the tool and the operation of masking accurately in the first place.

The tape is cut by an on-board cutter. A simple action of pressing the cutter mechanism to engage the cutter with the tape will sever the tape without stretching it. Further, a retractable guard serves two purposes: it covers the blade for safety purposes and it applies subtle pressure to the tape, trapping and tensioning the tape between the guard and on each side of the slot on the front shoe to assist in the cutting operation. Upon completion of the cut, it retracts to its passive state to effectively cover the exposed cutter edge when the cutter is not in use.

The manually operated tool is loaded by hand, pulling a length of tape from the mounted roll around the front shoe and beyond the rear shoe. The exposed adhesive surface of the tape on the underside of the tool is positioned onto the surface to adhere at the intersection. The tool is pushed forward and the tape automatically is drawn or peels from the roll as it is placed and applied to the surface.

The cutting action is engaged without stress to the tape. Upon completion of the cut, the tool is removed and the remaining curl of tape is gently hand pressed into the corner up to the abutting surface. The process is complete without further repositioning or alignment of the tape, fussing with the tape, massaging of the tape or applying of the tape to the surface.

The present invention achieves its intended purposes and advantages through a new "all in one" multifunction tool, utilizing a variety of standard roll of masking tape (manufactured by a variety of manufacturers) readily found in most hardware or painting decorating stores. Its versatility to be quickly adapted to use various standard widths of masking tape is unique and its simplicity of design with few moving parts, makes it a robust tool relatively inexpensive to manufacture and employing only readily available materials. The onboard cutter mechanism easily removes from the tool as does the measuring stop should that be necessary in some restricted places and should it be the preference of the operator.

SUMMARY OF INVENTION

In illustrative embodiments of the present invention, there is provided a manually operated tape applicator tool for the placement of adhesive backed masking tape from a roll wherein a frame unit, supporting a rotatable mounted spool, containing a static front shoe, and containing a static rear shoe are spaced apart in triangulation on a parallel axis. And wherein said tape roll in frictional engagement with said spool, is drawn over, around and under said static front shoe to be applied to a planar surface and under said static rear shoe for said tape to be further applied on said planar surface. And wherein said frame member is provided with a handle for holding and controlling the said tool. A removable measuring stop extending horizontally forward from said frame and adjacent to said front shoe at a predetermined distance equal to the length of said tape, when cut, will completely cover said planar surface up to an abutting wall intersection. And wherein the said rotatable spool, said front shoe and said rear shoe are of standard 1" width to reflect a standard width of 1" of said tape roll.

In illustrative embodiments of the present invention, there is provided a tool described herein wherein said cutting means is a single dagger like blade encased in a guarded cutter frame unit activated by manually pressing said cutter frame unit against an included spring to engage and sever said tape tensioned over a slot on said front shoe.

In illustrative embodiments of the present invention, there is provided a tool described herein wherein the rubber guard applies pressure, trapping the tape across the said slot in said front shoe thereby aiding in the clean cutting of the said tensioned tape.

In illustrative embodiments of the present invention, there is provided a tool described herein wherein said cutter unit frictionally fits into a vertical pocket on said frame opposite said slot on said front shoe to aid in easy removal of the said cutter unit.

In illustrative embodiments of the present invention, there is provided a tool described herein wherein its adaptation for use of 1.25" standard tape width is made by sliding a 1.25" long friction fit sleeve over said front shoe and sliding a 1.25" long friction fit sleeve over said rear shoe.

In illustrative embodiments of the present invention, there is provided a tool described herein wherein its adaptation for use of 1.5" standard tape width is made by sliding a 1.5" long friction fit sleeve over said front shoe and sliding a 1.5" long friction fit sleeve over said rear shoe.

In illustrative embodiments of the present invention, there is provided a tool described herein wherein its adaptation for use of 2" standard tape width is made by sliding a 2" long friction fit sleeve over said front shoe and sliding a 2" long friction fit sleeve over said rear shoe.

In illustrative embodiments of the present invention, there is provided a tool described herein wherein the said measuring stop is a frictional fit into a horizontal pocket on the said frame adjacent to the said front shoe.

In illustrative embodiments of the present invention, there is provided a tool described herein wherein guiding of the deposited said tape to said intersection is by means of said roll of tape, the said front shoe and the said rear shoe all gliding against the adjacent surface to which the said tape is deposited.

In illustrative embodiments of the present invention, there is provided a tool described herein wherein guiding of the deposited said tape to said intersection is by means of said roll of tape (1.25" width), corresponding 1.25" width of said front sleeve and corresponding width of said rear sleeve.

In illustrative embodiments of the present invention, there is provided a tool described herein wherein guiding of the deposited said tape to said intersection is by means of said roll of tape (1.5" width), corresponding 1.5" width of said front sleeve and corresponding 1.5" width of said rear sleeve.

In illustrative embodiments of the present invention, there is provided a tool described herein wherein guiding of the deposited said tape to said intersection is by means of said roll of tape (2" width), corresponding 2" width of said front sleeve and corresponding 2" width of said rear sleeve.

This tool design considered, functionality combined with simplicity, combined with ease of manufacture combined with low manufacturing cost, wherein a standard roll of masking tape mounted onto the tool, rotates, as the tape initially is pulled over, around and under a static front shoe to adhere to the surface and then further applied completely by a static rear shoe to the intended surface.

This tool eliminates the individual limits inherent in other tape applicators, namely:

by comparison, it is low cost to manufacture, few moving parts, no acquired skill level to successfully operate to produce professional results:

has an onboard removable measuring stop to measure the tape up to an abutting surface:

has an onboard removable cutter to exact a clean cut to the tape:

adapts quickly, easily and simply to use masking tape of various standard widths:

uses generic standard masking tape available from most hardware or painting stores and permits the operator to use a tape of choice whether an expensive masking tape or an inexpensive masking tape.

PARTS LIST REFERENCING DRAWING 1

| No. | Name | Quantity |
| --- | --- | --- |
| 1 | HANDLE | 1 |
| 2 | FRAME BODY | 1 |
| 3 | SPOOL | 1 |
| 4 | SLOTTED FRONT SHOE | 1 |
| 5 | REAR SHOE | 1 |
| 6 | MEASURING STOP | 1 |
| 7 | CUTTER ASSEMBLY | 1 |
| 8 | ARROW SHAPED CUTTER | 1 |
| 9 | SPRING | 1 |
| 10 | AXLE | 1 |
| 11 | SLOTTED FRONT SHOE SLEEVE | 3 |
| 12 | REAR SHOE SLEEVE | 1 |
| 13 | FLEXIBLE GUARD | 1 |
| 14 | FRONT SHOE SLOT | 1 |
| 15 | CUTTER ASSEMBLY POCKET | 1 |
| 16 | MEASURING STOP POCKET | 1 |
| 17 | SLEEVE SLOT | 1 |

DETAILED DESCRIPTION

Figure 1:
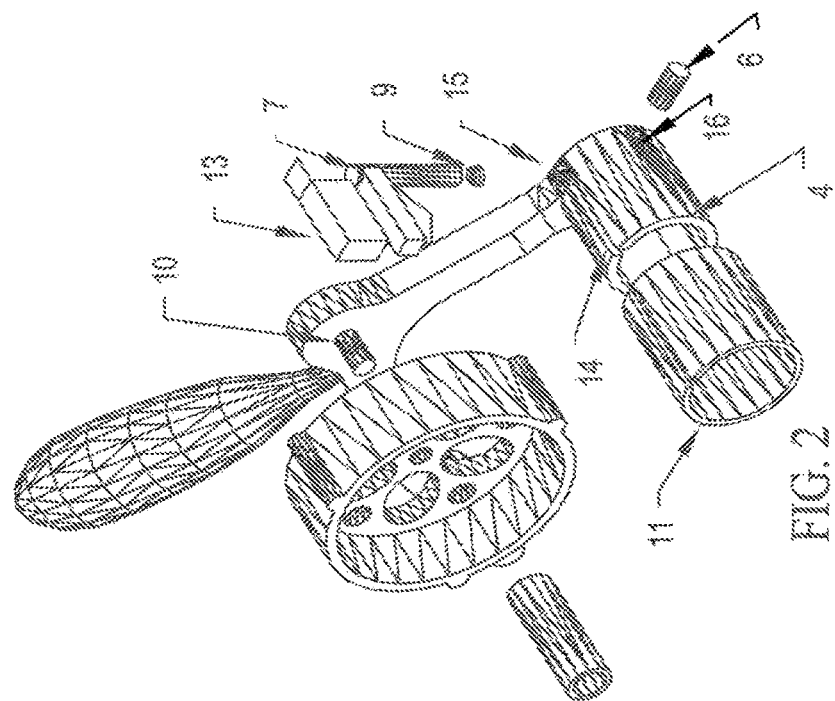
FIG. 1 depicts an exploded view of the painters tape tool showing all parts of the tool and their respective positioning, relationship and alignment to each other.
Figure 2:
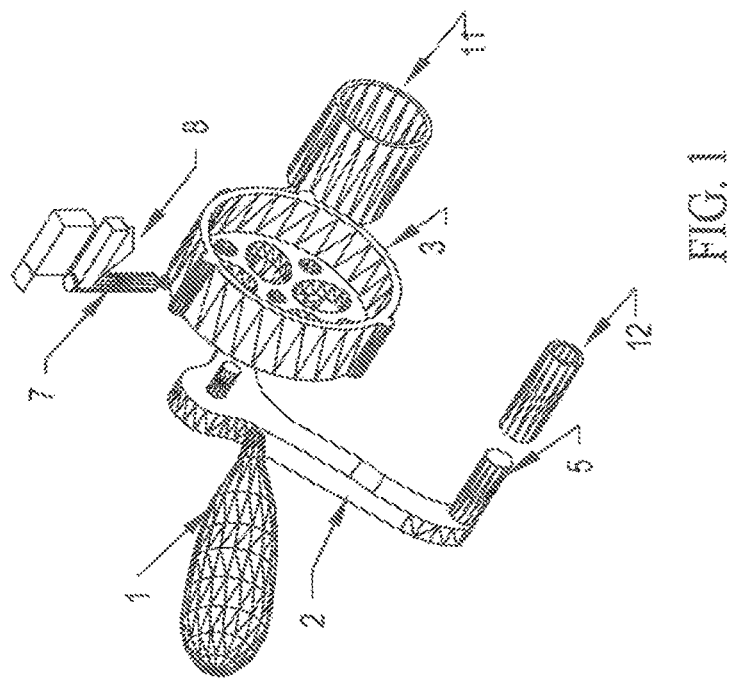
FIG. 2 is the same drawing as FIG. 1 but viewed from a different perspective to aid in clarity.
Figure 4:
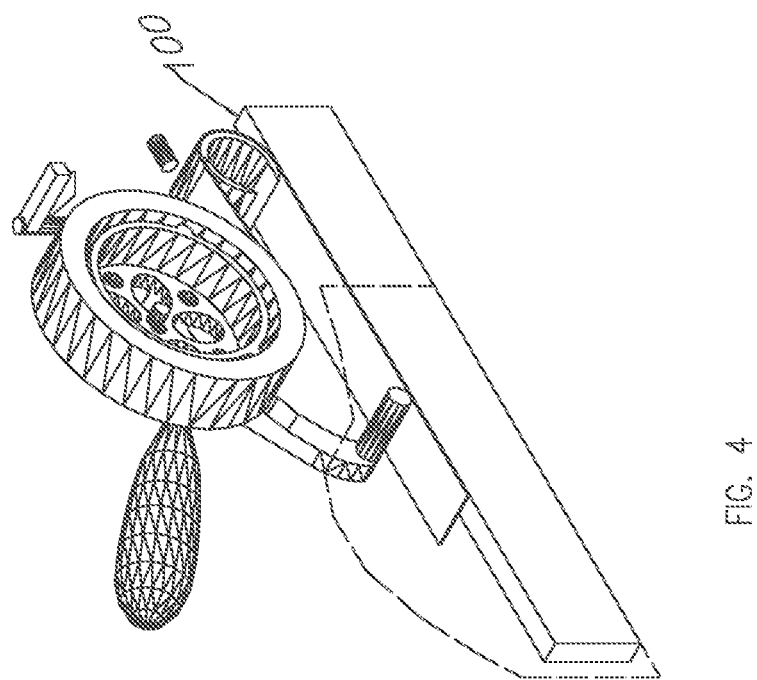
FIG. 4 is the same arrangement as FIG. 3 but viewed from a different perspective to aid clarity.
Figure 3:
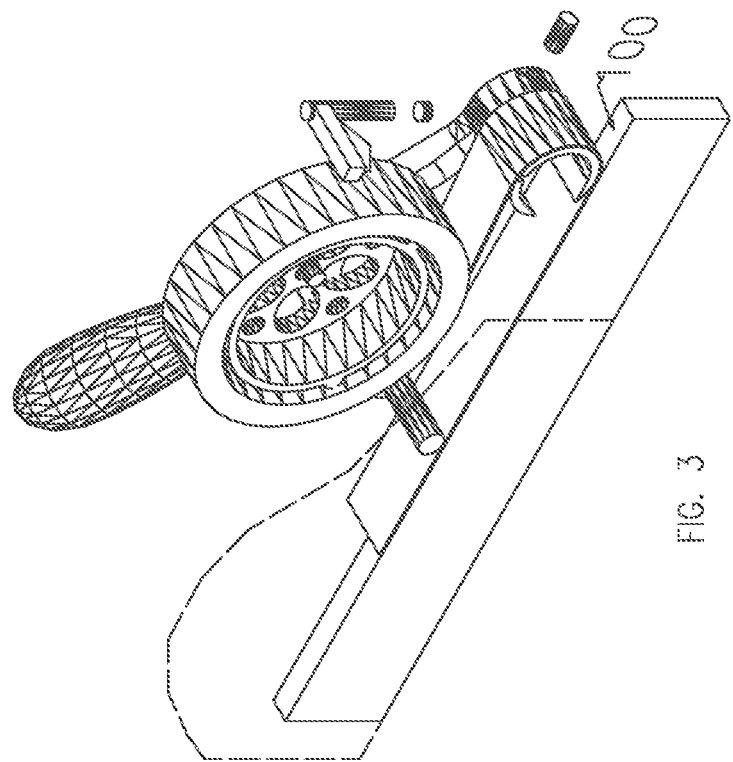
FIG. 3 depicts the assembled masking tape tool together with a mounted roll of tape showing its path of travel.

The tool of the invention in reference to FIG. 1 and FIG. 2 includes a frame (2) consisting of three general hubs positioned in triangular geometry in a vertical plane to which is mounted a rotatable spool (3) on to the axle (10) which is an integral part of the upper general hub. A front shoe (4) is an integral part of the front hub. A rear shoe (5) is an integral part of the rear hub.

The front shoe (4) places/applies the tape to the planar surface (100). The rear shoe (5) applies the tape to the planar surface (100).

An integral handle (1) on the frame aids the operator to hold and control the tool forward during the masking tape placement application.

As the Taper tool moves along the intended planar surface (100), the masking tape roll rotates and is guided along the surface of the frame which in turn assists in the continuous alignment of the masking tape as it peels off the roll. The front shoe (4) sets the tape to the surface (100) and the rear shoe (5) further applies the tape to the surface (100). No further action is required with the masking tape on the surface (100) either to reposition accurately, or to apply prior to paint application.

The cutter unit (7) consists of a vertical post and a horizontal cross member designed to support a dagger like cutter blade (8) and is positioned into a vertical pocket (15) on the frame (2).

The retracted removable cutter unit (7) is positioned above the slot (14) in the front shoe (4). When the cutter unit (7) is pressed, the singular dagger like cutter (8) pierces the tensioned tape thru the slot (14) on the front shoe (4) and upon release of the cutter unit (7) the cutter unit (7) retracts by way of the included spring (9) to its normal passive state and position above and clear of the masking tape.

The rubber guard (13) on the cutter unit (7) completely covers the cutter edge (8) when the cutter unit (7) is in its upper passive state and position. The cutting unit is engaged/pressed to permit the dagger shaped cutter (8) to come into contact with the tape. The rubber guard (13) also engages the tape during the cutting action and applies subtle pressure to the tape against the front shoe (4) on each side of the slot (14) thus further tensioning the tape causing the tape to remain taut over the slot (14) to assist in the cutting and easy separation of the masking tape. The cutter unit (7) may be lifted out of the friction fit pocket subject to operator's preference. The tape also may be severed by placing a knife edge (not included in this equipment or application or drawing) through the tape at the slot (14) location.

The removable horizontal measuring stop (6) is positioned in the horizontal pocket (16) located on the front hub adjacent to the front shoe (4) on the frame (2) as shown on the drawing. Its function (the measuring stop 6) is to cause the tool to stop at the predetermined distance (when it abuts a wall or other surface denoting the end point of masking a surface (100)). When the tape is cut to this pre-measured length the tape will accurately place completely up to the abutting wall without further cutting/trimming action or other fussing with the tape.

Upon completion of the cut and release of the cutter unit (7), the spring (9) causes the cutter unit (7) to return to its normal state of rest above and clear of the front shoe (4) and the rubber guard (13) will automatically return to its normal passive state to completely cover the cutter (8).

A generic standard roll of tape frictionally mounts onto the rotatable spool (3) and tape is manually drawn (adhesive side up) over and around and under the front shoe (4) where it is pressed onto the intended planar surface (100) by the front shoe (4). As the rear shoe (5) passes over the applied tape it is further "applied" or "seated" to the surface (100) and the tape will not require further fussing and provide a bleed free seal in preparation for the paint.

The rotatable spool (3) and the front shoe (4) and rear shoe (5) are of standard tape width, of 1".

A removable 1.25" sleeve (11) friction fit snaps onto the front shoe (4), and a removable 1.25" sleeve (12) friction fit snaps onto the rear shoe (5) to adapt the tool to use standard 1.25" wide tape.

Likewise a removable 1.5" sleeve (11) friction fit snaps onto the front shoe (4) and a removable 1.5" sleeve (12) friction fit snaps onto the rear shoe (5) to adapt the tool to use standard 1.5" wide tape.

Likewise a removable 2" sleeve (11) friction fit snaps onto the front shoe (4) and a removable 2" sleeve (12) friction fit snaps onto the rear shoe (5) to adapt the tool to use standard 2" wide tape.

The spool (3) remains generic for all tape widths as the hole in standard, "off-the-shelf", tape rolls reflect the industry standard sameness regardless of tape width.

The shape of the central frame permits rigidity to the tool and also provides an alignment surface on which the spool (3) and the roll of tape glides and maintains trueness in the vertical plane as the tape is peeled off the roll.

The front shoe (4) and rear shoe (5) designs are not limited to the cylindrical cross-section as shown, but may be elliptically or rectangular, or any combination of polygonal shapes in cross-section without disaffecting the functional operation of the tool.

This tool is unique in its simplicity of operation, simplicity of design, simplicity of construction with few moving parts, low manufacturing costs and by extension, low retail costs and multifunctional use in the measuring, cutting and accurate placement and applying of various manufacturers of various standard roll widths of masking tape. Standard materials are used in its manufacture.

The invention claimed is:

1. A tape applicator tool for the placement of adhesive backed tape onto a surface, the tool comprising:
   A) a frame unit comprising:
      i) a handle;
      ii) a rotatable spool operable to frictionally engage a roll of tape, the spool having a width of 1 inch;
      iii) a static front shoe operable to engage with the tape by drawing the tape around the front shoe, thereby applying the tape to the surface and forming an applied tape, the front shoe having a width of 1 inch and having a slot; and
      iv) a static rear shoe operable to engage with the applied tape by applying force to the applied tape towards the surface, the rear shoe having a width of 1 inch;
   wherein the rotatable spool, the front shoe and the rear shoe are spaced apart in triangulation and the rotatable spool, the front shoe and the rear shoe are on parallel axes; and
   B) a removable measuring stop extending from the frame and adjacent to the front shoe and extending in a direction away from each of the rotatable spool, the front shoe and the rear shoe and parallel to a direction of the applied tape, the removable measuring stop operable to frictionally fit into a pocket on the frame.

2. The tool according to claim 1 further comprising a removable cutter unit extending from the frame unit and adjacent to the front shoe, the cutter unit comprising a blade operable to cut the tape by manually pressing said cutter unit against a spring to engage and cut tape tensioned over the slot.

3. The tool according to claim 2 wherein the cutter unit comprises a guard operable to apply pressure to the tape tensioned over the slot, thereby trapping the tensioned tape across the slot.

4. The tool according to claim 2 wherein the removable cutter unit frictionally fits into a pocket on the frame.

5. The tool according to claim 3 wherein the removable cutter unit frictionally fits into a pocket on the frame.

6. The tool according to claim 1 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

7. The tool according to claim 2 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

8. The tool according to claim 3 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

9. The tool according to claim 4 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

10. The tool according to claim 5 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

11. A tape applicator tool for the placement of adhesive backed tape onto a surface, the tool comprising:
A) a frame unit comprising:
    i) a handle;
    ii) a rotatable spool operable to frictionally engage a roll of tape, the spool having a width of 1 inch;
    iii) a static front shoe operable to engage with the tape by drawing the tape around the front shoe, thereby applying the tape to the surface and forming an applied tape, the front shoe having a width of 1 inch and having a slot; and
    iv) a static rear shoe operable to engage with the applied tape by applying force to the applied tape towards the surface, the rear shoe having a width of 1 inch;
wherein the rotatable spool, the front shoe and the rear shoe are spaced apart in triangulation and the rotatable spool, the front shoe and the rear shoe are on parallel axes;
B) a removable measuring stop extending from the frame and adjacent to the front shoe and extending in a direction away from each of the rotatable spool, the front shoe and the rear shoe and parallel to a direction of the tape applied tape; and
C) a removable cutter unit extending from the frame unit and adjacent to the front shoe, the cutter unit comprising a blade operable to cut the tape by manually pressing said cutter unit against a spring to engage and cut the tape tensioned over the slot.

12. The tool according to claim 11 wherein the removable cutter unit comprises a guard operable to apply pressure to the tape tensioned over the slot, thereby trapping the tensioned tape across the slot.

13. The tool according to claim 11 wherein the removable cutter unit frictionally fits into a pocket on the frame.

14. The tool according to claim 12 wherein the removable cutter unit frictionally fits into a pocket on the frame.

15. The tool according to claim 11 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

16. The tool according to claim 12 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

17. The tool according to claim 13 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

18. The tool according to claim 14 further comprising a first removable friction fit sleeve operable to fit over the front shoe and a second removable friction fit sleeve operable to fit over the rear shoe, wherein the first and second removable friction fit sleeves have the same width and the width may be selected from the group consisting of: 1.25 inches, 1.5 inches and 2.00 inches.

19. The tool according to claim 11 wherein the removable measuring stop is operable to frictionally fit into a pocket on the frame adjacent to the front shoe.

20. The tool according to claim 13 wherein the removable measuring stop is operable to frictionally fit into a pocket on the frame adjacent to the front shoe.

* * * * *